United States Patent
Chin et al.

(10) Patent No.: US 7,218,922 B2
(45) Date of Patent: May 15, 2007

(54) ADMINISTRATOR DESIGNATION OF ONE OR MORE TONES AND/OR ONE OR MORE ANNOUNCEMENTS THAT ARE PLAYABLE IN A COMMUNICATION SESSION AS INTERRUPTIBLE

(75) Inventors: Frances Mu-Fen Chin, Naperville, IL (US); Sandra Lynn True, St. Charles, IL (US); Yu Yin, Aurora, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 362 days.

(21) Appl. No.: 10/718,242

(22) Filed: Nov. 20, 2003

(65) Prior Publication Data

US 2005/0113063 A1    May 26, 2005

(51) Int. Cl.
*H04M 11/00* (2006.01)

(52) U.S. Cl. .................................. 455/414.1; 455/406

(58) Field of Classification Search ............. 455/414.1, 455/405, 406
See application file for complete search history.

(56) References Cited

U.S. PATENT DOCUMENTS

| | | | |
|---|---|---|---|
| 5,155,760 A | * | 10/1992 | Johnson et al. .......... 379/88.01 |
| 6,148,069 A | * | 11/2000 | Ekstrom et al. ....... 379/221.08 |
| 6,886,033 B1 | * | 4/2005 | Brush et al. ................. 709/217 |
| 2004/0017908 A1 | * | 1/2004 | Pelletier et al. ........ 379/207.02 |

* cited by examiner

*Primary Examiner*—Temica Beamer

(57) ABSTRACT

A control component of an apparatus in one example comprises an interface usable by an administrator to designate one or more tones and/or one or more announcements that are playable in a communication session as interruptible.

20 Claims, 3 Drawing Sheets

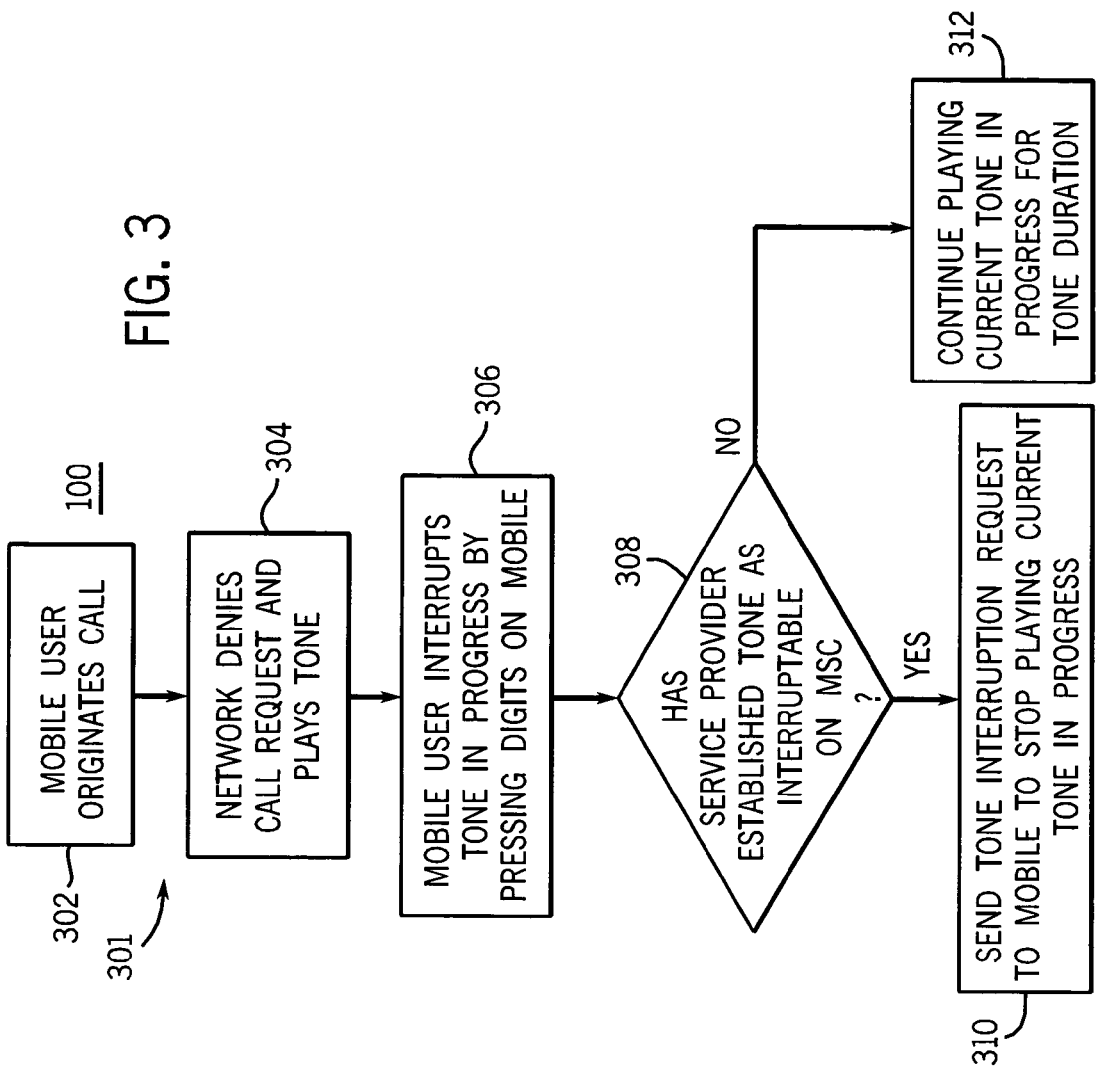
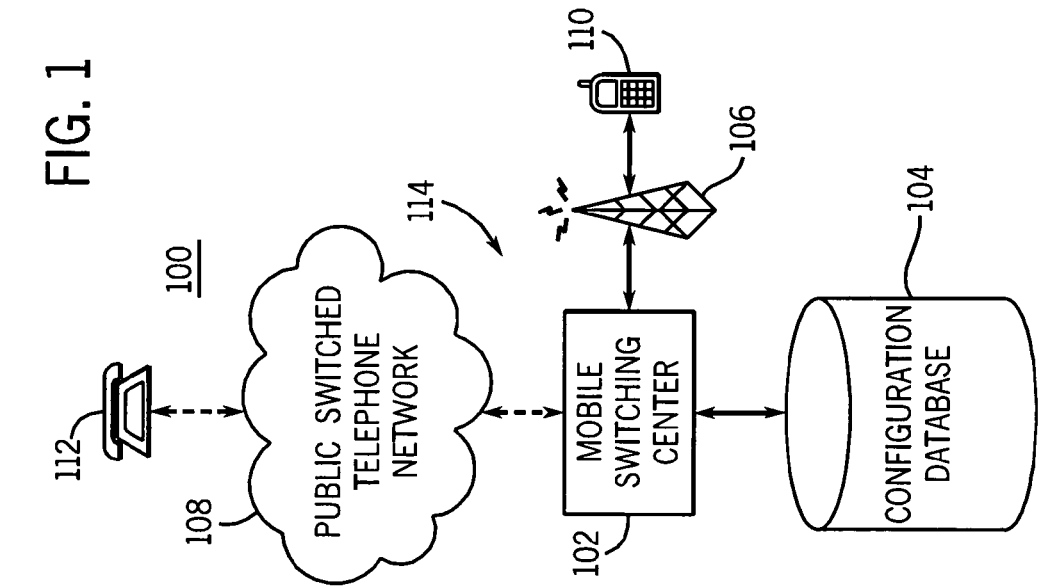

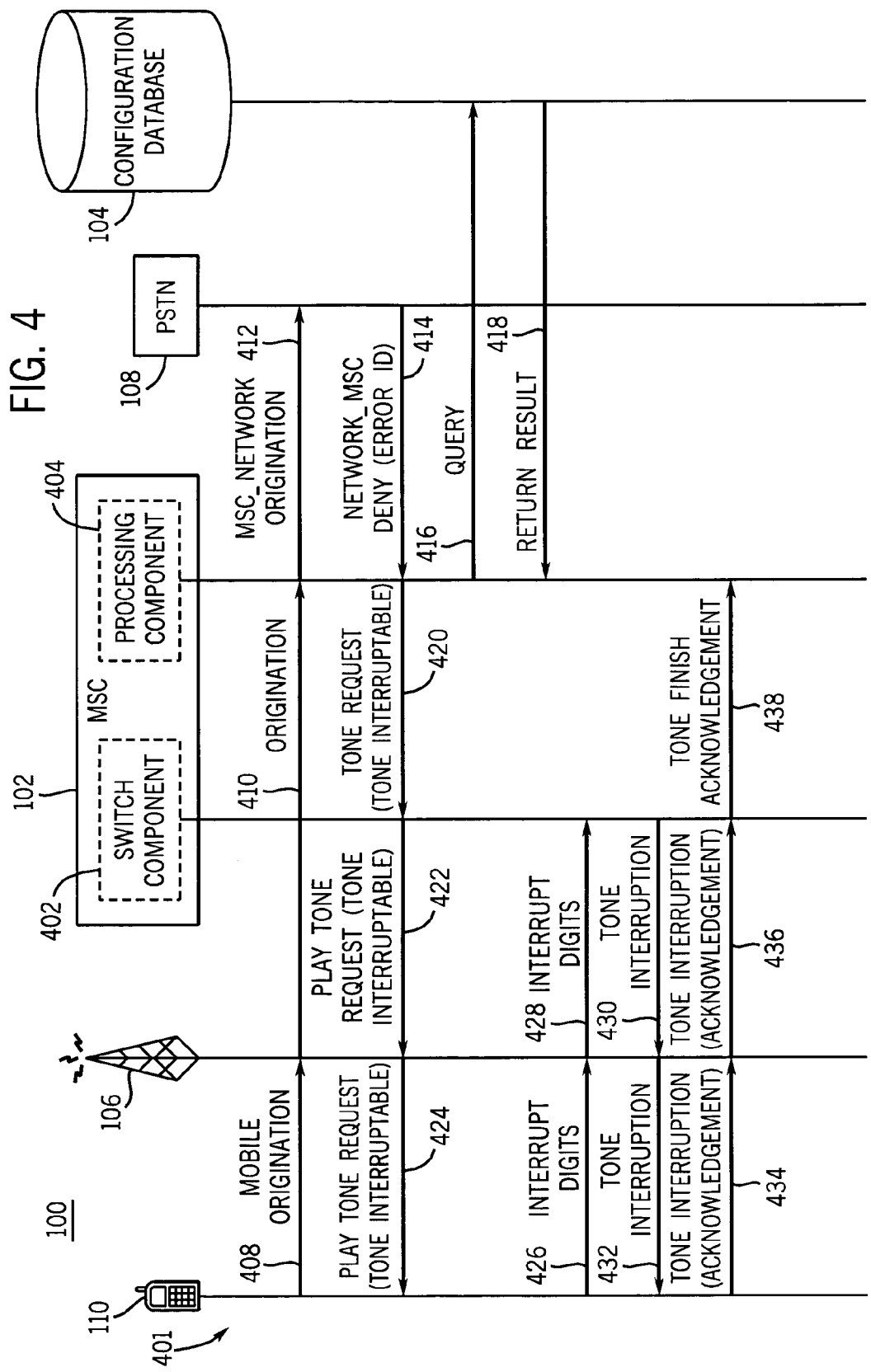

ADMINISTRATOR DESIGNATION OF ONE OR MORE TONES AND/OR ONE OR MORE ANNOUNCEMENTS THAT ARE PLAYABLE IN A COMMUNICATION SESSION AS INTERRUPTIBLE

TECHNICAL FIELD

The invention relates generally to telecommunications and more particularly to tones and/or announcements playable in communication sessions.

BACKGROUND

In telecommunication networks, mobile switching centers play tones and/or announcements at communication devices. The tones and/or announcements comprise audible signals playable for users of the communication devices. The mobile switching centers may employ the tones and/or announcements for various reasons. For example, some tones and/or announcements convey information to the users of the communication devices while other tones and/or announcements request information from the users of the communication devices. Other tones and/or announcements indicate occurrence of an event in the telecommunication networks or a condition of the telecommunication network.

Often users of the communication devices know the meaning of certain tones and/or announcements without having to hear the tones and/or announcements play to completion. For example, after hearing a tone and/or announcement one or more times, the users of the communication devices may remember the meaning associated with the tone and/or announcement after hearing just a portion of the tone and/or announcement. The tone and/or announcement in one example is played at the communication device during a communication session, such as a telephone call. After hearing the portion of the tone and/or announcement, the users may desire to interrupt the tone and/or announcement to proceed with a next phase of the communication session.

Manufacturers of the telecommunication networks in one example hard code one or more announcements as being interruptible by the users of the communication device. For example, the manufacturers of the telecommunication networks may permanently designate the one or more announcements as interruptible prior to deployment of the telecommunication networks. As one shortcoming, the pre-deployment designation of an announcement as interruptible or not interruptible is not dynamically changeable during operation of the telecommunication networks. As another shortcoming, the telecommunication networks do not allow interruption of tones.

Thus, a need exists for a telecommunication network that allows for dynamically provisioned designations of tones and/or announcements. A further need exists for a telecommunications network that allows interruption of tones.

SUMMARY

The invention in one implementation encompasses an apparatus. The apparatus comprises a control component that comprises an interface usable by an administrator to designate one or more tones and/or one or more announcements that are playable in a communication session as interruptible.

Another implementation of the invention encompasses a method. An administrator is interfaced with a configuration database to allow the administrator to designate in the configuration database one or more tones and/or one or more announcements that are playable in a communication session as interruptible.

Yet another implementation of the invention encompasses an article. The article comprises one or more computer-readable signal-bearing media. The article comprises means in the one or more media for interfacing an administrator with a configuration database to allow the administrator to designate in the configuration database one or more tones and/or one or more announcements that are playable in a communication session as interruptible.

DESCRIPTION OF THE DRAWINGS

Features of exemplary implementations of the invention will become apparent from the description, the claims, and the accompanying drawings in which:

FIG. 1 is a representation of an exemplary implementation of an apparatus that comprises one or more mobile switching centers, one or more configuration databases, one or more base stations, one or more public switched telephone networks, and one or more communication devices.

FIG. 3 represents exemplary logic that serves to allow the mobile switching center of the one or more mobile switching centers of the apparatus of FIG. 1 to determine whether a tone and/or announcement has been designated by an administrator as interruptible.

FIG. 4 is a representation of one exemplary message flow for interruption of a tone and/or announcement based on an interruption request from a communication device of the one or more communication devices of the apparatus of FIG. 1.

DETAILED DESCRIPTION

Figure 2:
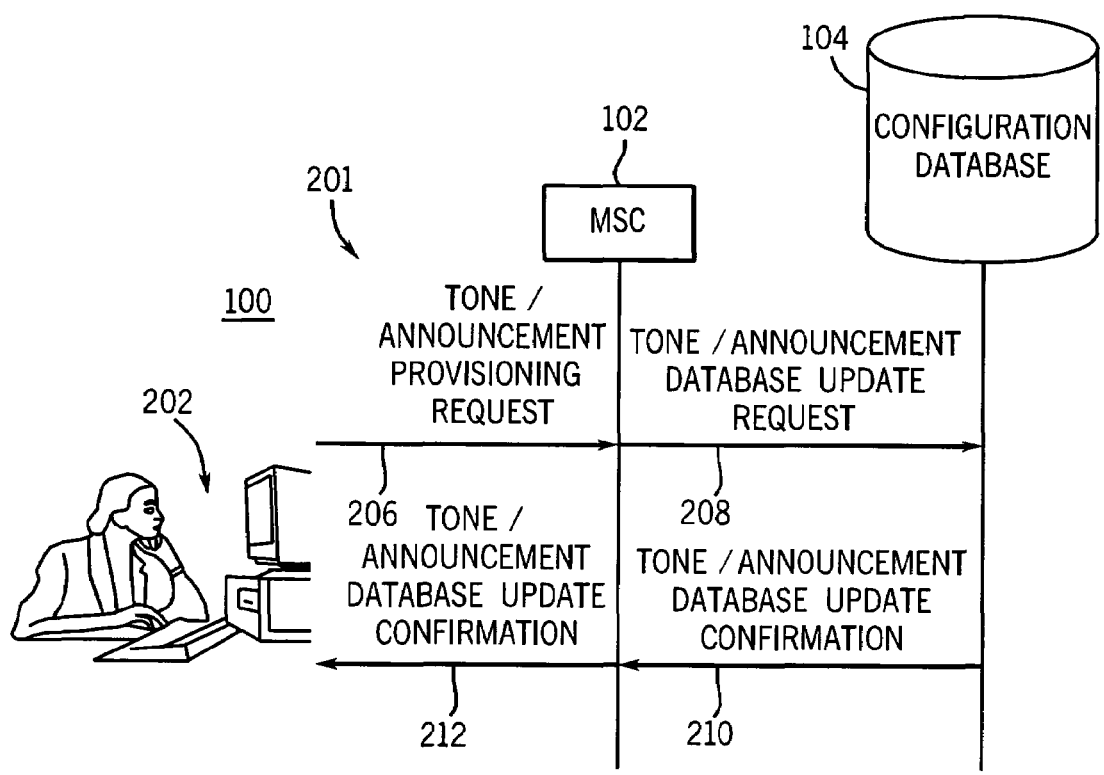
FIG. 2 is a representation of one exemplary message flow for designation by an administrator for one or more tones and/or one or more announcements to be interruptible upon an interruption request from a communication device of the one or more communication devices of the apparatus of FIG. 1.

Turning to FIG. 1, an apparatus 100 in one example comprises one or more control components, for example, one or more mobile switching centers 102. The apparatus 100 in one example further comprises one or more configuration databases 104, one or more base stations 106, one or more public switched telephone networks ("PSTNs") 108, and one or more communication devices 110 and 112. For example, the mobile switching center 102, the configuration database 104, the base station 106, the public switched telephone network 108, and the communication devices 110 and 112 make up portions of a telecommunications network 114.

The mobile switching center 102 supports one or more mobile telecommunication devices, for example, the communication device 110. In one example, the mobile switching center 102 serves as a serving mobile switching center ("S-MSC") to support an air interface connection with the communication device 110 through the base station 106. In another example, the mobile switching center 102 serves as both the serving mobile switching center and an originating mobile switching center to support the air interface connection and call delivery for the communication device 110.

The mobile switching center 102 plays one or more tones and/or one or more announcements at one or more of the communication devices 110 and 112. For example, the mobile switching center 102 may play a tone/announcement to the communication device 110 in a communication session. The tones/announcements may comprise an audio signal, a tone, an announcement, a tone played along with an announcement, a repeating series of tones, and the like. The tone/announcement may be indicated as interruptible or not interruptible. For example, an administrator may designate the tone/announcement as interruptible or not interruptible. The administrator in one example designates the tone/announcement as interruptible to allow a user of one of the communication devices 110 and 112 involved in a communication session to force the mobile switching center 102 to stop playing the tone/announcement and continue through the duration of the communication session. For example, the mobile switching center 102 skips a remainder of the tone and progresses to a next phase in the communication session.

The administrator in one example is associated with a service provider. Thus, the service provider may customize which tones/announcements are interruptible. For example, the service provider may customize a tone and/or announcement service for the communication devices 110 and 112 by designating one or more tones and/or announcements as interruptible and one or more other tones and/or announcements as not interruptible. In one example, the service provider determines which tones would be beneficial for users to be able to interrupt. In another example, the service provider receives requests from users that are supported by the service provider. The requests may indicate tones/announcements that the user desires to be interruptible. Then, the administrator associated with the service provider may designate the tones/announcements as interruptible or not interruptible.

If the administrator provisions a tone/announcement as interruptible, then the mobile switching center 102 may stop playing the tone/announcement upon receipt of a termination request from a user of a communication device (e.g., the communication device 110). If the administrator provisions a tone/announcement as not interruptible or the tone/announcement is indicated as not interruptible, then the mobile switching center 102 continues playing the tone/announcement upon receipt of the termination request.

Exemplary embodiments of tones that may be provisioned by the administrator as interruptible comprise a ring back tone, audible alerting tone, congestion tone, reorder tone, call waiting tone, barge in tone, denial tone burst, incoming additional call tone, and priority additional call tone. Exemplary embodiments of announcements that may be provisioned by the administrator as interruptible comprise a disconnected number announcement, redirect call announcement, pre-paid card has expired announcement, pre-paid card is invalid announcement, low balance announcement, add area code before dialed number announcement, and dialed number does not exist announcement.

The mobile switching center 102 comprises an interface usable by the administrator to designate tones/announcements that are playable in a communication session as interruptible or not interruptible. For example, the administrator designates the tones/announcements as interruptible or not interruptible in the configuration database 104. The configuration database 104 stores one or more indications associated with the tones/announcements that are designated by the administrator as interruptible or not interruptible.

The administrator sends requests through the interface of the mobile switching center 102 to the configuration database 104. The interface may comprise a graphical user interface ("GUI"), a signaling path, database update process, or the like. The administrator may employ the interface to create a new entry in the configuration database 104, set portions of existing entries, or modify existing entries. For example, the administrator may access the configuration database 104 to set a tone as interruptible, then re-access the configuration database 104 to change the designation associated with the tone to not interruptible. The configuration database 104 allows the administrator to change designations associated with the tones/announcements. The administrator may employ the interface of the mobile switching center 102 to make designations in the configuration database 104 during operation of the mobile switching center 102, for example, the administrator may make changes to the designations after deployment of the telecommunications network 114. Thus, the designations are dynamically changeable by the administrator.

The base station 106 communicatively couples the communication device 110 with the mobile switching center 102. The base station 106 supports air interface communication with the communication device 110. The communication device 110 in one example comprises a mobile communication device, such as, a mobile telephone. The public switched telephone network 108 communicatively couples the communication device 112 with the mobile switching center 102. The communication device 110 in one example comprises a landline communication device, such as, a landline telephone.

The communication devices 110 and 112 may comprise either mobile communication devices or landline communication devices. The mobile switching center 102 plays tones and/or announcements to the communication devices 110 and 112. A portion of the tones and/or announcements are interruptible. Thus, to interrupt the tone/announcement, the user of the communication devices 110 and 112 sends a termination request to the mobile switching center 102 to request to the mobile switching center 102 to stop playing the tone/announcement. In one example, the communication devices 110 and 112 comprises one or more buttons to interrupt the tone/announcement. Upon a user of the communication device 110 pressing one or more of the buttons, the communication device 110 sends an indication of the button press to the mobile switching center 102 to initiate an interruption of the tone.

Turning to FIGS. 1–2, an illustrative description of another exemplary operation of the apparatus 100 is now presented, for explanatory purposes. A message flow 201 represents an exemplary designation by an administrator 202 for one or more tones and/or one or more announcements to be interruptible upon an interruption request from one or more of the communication devices 110 and 112. The mobile switching center 102 comprises an interface usable by the administrator 202 to designate the one or more tones and/or the one or more announcements that are playable in a communication session as interruptible.

The administrator 202 in one example comprises a service provider associated with one or more of the communication devices 110 and 112. The service provider may customize a tone and/or announcement service for the communication devices 110 and 112 by employing the interface to designate the one or more tones and/or the one or more announcements as interruptible and one or more other tones and/or one or more other announcements as not interruptible.

To provision tones and/or announcements as interruptible or not interruptible, the administrator 202 sends a provisioning request 206 to the mobile switching center 102. In one example, the provisioning request 206 comprises a list of announcements and/or tones for designation as interruptible.

In another example, the provisioning request 206 comprises a list of announcements and/or tones for designation as not interruptible. In yet another example, the provisioning request 206 comprises a first list of announcements and/or tones for designation as interruptible and a second list of announcements and/or tones for designation as not interruptible.

The mobile switching center 102 sends a database update request 208 to the configuration database 104. The configuration database 104 stores indications associated with the tones and/or announcements. The indications represent whether the tones and/or announcements are interruptible or not interruptible. The database update request 208 serves to set or change the indications to the preferences of the administrator 202 that were received in the provisioning request 206.

After updating the indications, the configuration database 104 sends a database update confirmation 210 to the mobile switching center 102. The database update confirmation 210 serves to notify the mobile switching center 102 that the database update request 208 was successful. Upon receipt of the database update confirmation 210, the mobile switching center 102 sends a database update confirmation 212 to the administrator 202. The database update confirmation 212 serves to notify that the provisioning request 206 was successful.

Referring to FIGS. 1 and 3, exemplary logic 301 serves to allow the mobile switching center 102 to determine whether a tone and/or announcement has been designated by the administrator as interruptible. Also, the logic 301 serves to allow the mobile switching center 102 to interrupt the tone and/or announcement if the administrator has designated the tone and/or announcement as interruptible and to continue playing the tone at the communication device 110 if the tone has been designated as not interruptible. The logic 301 employs one or more steps, for example, STEPS 302, 304, 306, 308, 310, and 312.

At STEP 302, the user of the communication device 110 in one example initiates a communication session, such as a telephone call with the communication device 112. In one example, the mobile switching center 102 connects the telephone call between the communication devices 110 and 112. In another example, the mobile switching center 102 does not connect the telephone call. For example, at STEP 304, the mobile switching center 102 denies the connection of the telephone call and plays a tone to the communication device 110 to indicate the denied connection.

The user of the communication device 110 in one example knows the meaning of the tone after listening to a portion of the tone or listening to a portion of a sequence of repeating instances of the tone. Thus, at STEP 306, the user of the communication device 110 sends an interrupt request through the base station 106 to the mobile switching center 102. For example, the user of the communication device 110 may press a button on the communication device 110 to initiate an interruption of the tone. The mobile switching center 102 interprets the button press as the interruption request.

At STEP 308, the mobile switching center 102 determines whether the tone is interruptible. For example, the mobile switching center 102 checks the configuration database 104 to determine whether the administrator has designated the tone as interruptible. If the tone is interruptible, then the mobile switching center 102 proceeds to STEP 310 to stop playing the tone at the communication device 110. If the tone is not interruptible, then the mobile switching center 102 proceeds to STEP 312 to continue playing the tone at the communication device 110 through the intended duration of the tone.

Turning to FIGS. 1 and 4, an illustrative description of one exemplary operation of the apparatus 100 is now presented, for explanatory purposes. A message flow 401 represents an exemplary interruption of a tone and/or announcement based on an interruption request from the communication device 110. The mobile switching center 102 in one example comprises a switch component 402 and a processing component 404. The switch component 402 and the processing component 404 in one example serve to interface the mobile switching center 102 with the base station 106 and the public switched telephone network 108.

To begin a communication session, the communication device 110 in one example sends a mobile origination message 408 to the base station 106. For example, the mobile origination message 408 serves to indicate to the base station 106 to begin a telephone call with another communication device, such as the communication device 112. The mobile origination message 408 in one example comprises an air interface message, such as an Interim Standard ("IS-95") or ("IS-2000") message.

Upon receipt of the mobile origination message 408, the base station 106 sends an origination message 410 to the mobile switching center 102. For example, the processing component 404 receives the origination message 410. The origination message 410 serves to indicate to the mobile switching center 102 to extend the telephone call to the communication device 112.

Upon receipt of the origination message 410, the processing component 404 sends an origination message 412 to the public switched telephone network 108. The origination message 412 serves to indicate to the public switched telephone network 108 to deliver and connect the telephone call with the communication device 112. The origination message 412 in one example comprises an Integrated Services Digital Network ("ISDN") User Part ("ISUP") message. The public switched telephone network 108 serves to connect the telephone call to the communication device 112. Upon occurrence of an event in the telephone call, need for information, or need to present information, the public switched telephone network 108 sends a deny message 414 to the processing component 404 of the mobile switching center 102. "NETWORK_MSC DENY (ERROR ID)" in one example serves to represent the deny message 414. "ERROR ID" serves to represent an error code that indicates occurrence of a specific error. The processing component 404 maps the error code to a specific tone/announcement playable for the communication device 110. The deny message 414 serves to acknowledge receipt of the origination message 412. Also, the deny message 414 instructs the mobile switching center 102 to play the specific tone/announcement at the communication device 110.

Upon receipt of the deny message 414, the mobile switching center 102 accesses the configuration database 104 to determine whether the tone/announcement is indicated as interruptible or not interruptible. For example, the processing component 404 sends a query 416 to the configuration database 104 to request whether the tone/announcement requested by the deny message 414 is interruptible or not interruptible. The configuration database 104 sends an indication of whether the tone/announcement is interruptible or not interruptible in a return result message 418 to the processing component 404.

In one example, the tone/announcement is indicated as not interruptible. Thus, the mobile switching center 102 does not grant any interruption requests from the communication devices 110 and 112 for the tone/announcement. In another example, the tone/announcement is indicated as interruptible. Thus, the processing component 404 sets the tone/announcement as interruptible in a tone request message 420 to the switch component 402. The tone request message 420 indicates which tone/announcement the switch component 402 should play to the communication device 110.

Upon receipt of the tone request message 420, the switch component 402 sends the tone/announcement to the base station 106 in a play tone/announcement request message 422. To play the tone/announcement at the communication device 110, the base station 106 sends a play tone/announcement request message 424 to the communication device 110. The user of the communication device 110 may know the meaning of the tone/announcement without having to hear the tone/announcement play to completion. For example, after hearing a tone/announcement one or more times, the user of the communication device 110 may remember the meaning associated with the tone/announcement after hearing just a portion of the tone/announcement. After hearing the portion of the tone/announcement, the user may desire to interrupt the tone/announcement to proceed with the telephone call. Thus, the user of the communication device 110 sends an interruption request 426 to the base station 106. For example, the interruption request 426 comprises a button press by the user of the communication device 110. The button press serves to initiate an interruption of the tone/announcement. The base station 106 forwards the button press to the switch component 402 of the mobile switching center 102 in an interruption request 428. The mobile switching center 102 interprets the button press as a request to stop playing tone/announcement.

Upon receipt of the interruption request 428, the switch component 402 of the mobile switching center 102 sends a tone interruption message 430 to the base station 106. The base station 106 sends a corresponding tone interruption message 432 to the communication device 110 to indicate that the mobile switching center 102 has stopped playing the tone/announcement. To acknowledge receipt of the tone interruption message 432, the communication device 110 sends an interruption acknowledgement 434 to the base station 106. The base station 106 forwards the acknowledgement in an interruption acknowledgement 436 to the switch component 402 of the mobile switching center 102. Upon receipt of the interruption acknowledgement 436, the switch component 402 sends a completion acknowledgement 438 to the processing component 404.

The apparatus 100 in one example comprises a plurality of components such as electronic components, computer hardware components, and/or computer software components. A number of such components can be combined or divided in the apparatus 100. An exemplary component of the apparatus 100 employs and/or comprises a set and/or series of computer instructions written in or implemented with any of a number of programming languages, as will be appreciated by those skilled in the art.

The apparatus 100 in one example employs one or more computer-readable signal-bearing media. One example of a computer-readable signal-bearing medium for the apparatus 100 comprises one or more instances of the recordable data storage medium of the mobile switching center 102 and the configuration database 104. For example, the recordable data storage medium comprises one or more of a magnetic, electrical, optical, biological, and atomic data storage medium. In another example, a computer-readable signal-bearing medium for the apparatus 100 comprises a modulated carrier signal transmitted over a network comprising or coupled with the apparatus 100, for instance, one or more of a telephone network, a local area network ("LAN"), the internet, and a wireless network.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. An apparatus, comprising:
   a control component that comprises an interface usable by an administrator to designate one or more tones and one or more announcements that are playable in a communication session as interruptible, wherein the one or more tones designated as interruptible comprise a) ring back tones, b) audible alerting tones, c) congestion tones, d) reorder tones, e) call waiting tones, f) barge in tones, g) denial tone bursts, h) incoming additional call tones, and i) priority additional call tones.

2. The apparatus of claim 1, wherein the administrator employs the interface to dynamically designate a tone as interruptible, and wherein the tone is playable at a communication device; and
   wherein the control component stops playing the tone at the communication device without playing the tone to completion upon receipt of an interruption request from a user of the communication device.

3. The apparatus of claim 2, wherein the administrator comprises a service provider associated with the communication device; and
   wherein the service provider may customize a tone and announcement service for the communication device by employing the interface to designate the one or more tones and the one or more announcements as interruptible and one or more other tones and one or more other announcements as not interruptible.

4. The apparatus of claim 2, wherein the user presses a button on the communication device to initiate an interruption of the tone; and
   wherein the control component interprets the button press as the interruption request, wherein the control component stops playing the tone at the communication device based on the button press.

5. The apparatus of claim 2, wherein the control component plays the tone at the communication device in a communication session; and
   wherein the user of the communication device sends the interruption request to the control component to skip a remainder of the tone and progress to a next phase in the communication session; and
   wherein upon receipt of the interruption request, the control component moves to the next phase in the communication session.

6. The apparatus of claim 1, wherein the control component comprises a mobile switching center.

7. The apparatus of claim 6, further comprising a configuration database that stores one or more indications associated with the one or more tones and the one or more announcements that are designated by the administrator as interruptible.

8. The apparatus of claim 7, wherein the administrator employs the interface to set the one or more indications in the configuration database to represent that the one or more tones and the one or more announcement are interruptible.

9. The apparatus of claim 7, wherein upon receipt of an instruction to play a tone at a communication device, the mobile switching center accesses the configuration database to determine whether the tone is indicated as interruptible or not interruptible; and
   wherein the mobile switching center plays the tone at the communication device.

10. The apparatus of claim 9, wherein upon receipt of an interruption request from a user of the communication device, the mobile switching center stops playing the tone at the communication device if the tone is indicated as interruptible; and
   wherein upon receipt of the interruption request from the user of the communication device, the mobile switching center continues playing the tone at the communication device if the tone is indicated as not interruptible.

11. The apparatus of claim 7, wherein the mobile switching center comprises the interface to allow the administrator to update one or more of the one or more indications from a representation of interruptible to a representation of not interruptible.

12. The apparatus of claim 1, wherein the control component allows the administrator to set a designation of a tone as interruptible and wherein the control component allows the administrator to change the designation of the tone to prevent interruption of the tone.

13. The apparatus of claim 1, wherein the one or more tones and the one or more announcements that are playable in the communication session comprise audible signals in a telephone call.

14. A method, comprising the step of:
   interfacing an administrator with a configuration database to allow the administrator to designate in the configuration database one or more tones and one or more announcements that are playable in a communication session as interruptible, wherein the one or more tones designated as interruptible comprise a) ring back tones, b) audible alerting tones, c) congestion tones, d) reorder tones e) call waiting tones, f) barge in tones, g) denial tone bursts, h) incoming additional call tones, and i) priority additional call tones.

15. The method of claim 14, wherein the administrator comprises a service provider associated with a communication device, and wherein the step of interfacing the administrator with the configuration database to allow the administrator to designate in the configuration database the one or more tones and the one or more announcements that are playable in the communication session as interruptible further comprises the steps of:
   allowing the service provider to modify the configuration database to customize a tone and announcement service for the communication device; and
   allowing access to the configuration database for the service provider to designate the one or more tones and the one or more announcements as interruptible and one or more other tones and one or more other announcements as not interruptible.

16. The method of claim 14, wherein the administrator dynamically designates a tone of the one or more tones as interruptible, and wherein the tone comprises an audible signal in a telephone call, the method further comprising the steps of:
   playing the tone at the communication device; and
   stopping the playing of the tone at the communication device before completion of the tone upon receipt of an interruption request from a user of the communication device.

17. The method of claim 14, further comprising the steps of:
   accessing the configuration database, upon receipt of art instruction to play a tone at a communication device, to determine whether the tone is indicated in the configuration database as interruptible or not interruptible; and
   playing the tone at the communication device.

18. The method of claim 17, further comprising the steps of:
   stopping the playing of the tone at the communication device upon receipt of an interruption request from a user of the communication device of the tone is indicated as interruptible; and
   continuing to play the tone at the communication device upon receipt of the interruption request from the user of the communication device if the tone is indicated as not interruptible.

19. The method of claim 14, further comprising the steps of:
   interfacing the administrator with the configuration database to allow the administrator access to the configuration database for an update of a designation of one or more of the one or more tones and the, one or more announcements from a representation of interruptible to a representation of not interruptible; and
   preventing an interruption of the one or more of the one or more tones and the one or more announcements with the representation of not interruptible.

20. A computer-readable medium having computer executable instructions for performing steps, comprising:
   means in the one or more media for interfacing an administrator with a configuration database to allow the administrator to designate in the configuration database one or more tones and one or more announcements that are playable in a communication session as interruptible, wherein the one or mare tones designated as interruptible comprise a) ring back tones, b) audible alerting tones, c) congestion tones, d) reorder tones, e) call waiting tones, f) barge in tones, g) denial tone burst h) incoming additional call tones, and i) priority additional call tones.

* * * * *